United States Patent
Seo et al.

(10) Patent No.: US 9,225,615 B2
(45) Date of Patent: Dec. 29, 2015

(54) METHOD FOR MANAGING NETWORK AND FOR PROVIDING SERVICE QOS

(75) Inventors: Jung-Min Seo, Seoul (KR); Jinkyung Hwang, Wonju-si (KR); Eun-Ho Choi, Seoul (KR); Sun-Jong Kwon, Seoul (KR); Eunkyoung Paik, Yongin-si (KR)

(73) Assignee: KT Corporation, Seongnam (KR)

(*) Notice: Subject to any disclaimer, the term of this patent is extended or adjusted under 35 U.S.C. 154(b) by 27 days.

(21) Appl. No.: 13/389,225

(22) PCT Filed: Aug. 5, 2010

(86) PCT No.: PCT/KR2010/005140
§ 371 (c)(1),
(2), (4) Date: Feb. 6, 2012

(87) PCT Pub. No.: WO2011/016683
PCT Pub. Date: Feb. 10, 2011

(65) Prior Publication Data
US 2012/0136996 A1 May 31, 2012

(30) Foreign Application Priority Data

Aug. 6, 2009 (KR) .................. 10-2009-0072495
Aug. 20, 2009 (KR) .................. 10-2009-0077203
Dec. 17, 2009 (KR) .................. 10-2009-0126111

(51) Int. Cl.
*H04L 12/24* (2006.01)

(52) U.S. Cl.
CPC ........ *H04L 41/5025* (2013.01); *H04L 41/5058* (2013.01); *H04L 41/0213* (2013.01); *H04L 41/069* (2013.01)

(58) Field of Classification Search
CPC ... H04L 29/08072; H04L 29/06; H04L 43/00; H04L 12/2602; H04L 41/22
USPC .................................. 709/224-226
See application file for complete search history.

(56) References Cited

U.S. PATENT DOCUMENTS

2007/0189152 A1* 8/2007 Tamura et al. ............... 370/216
2010/0131650 A1* 5/2010 Pok et al. ..................... 709/226
2010/0195503 A1* 8/2010 Raleigh ........................ 370/235

FOREIGN PATENT DOCUMENTS

KR   10-2009-0076719 A    7/2009

OTHER PUBLICATIONS

Murase, Tutomu, et al., "Overlay Netweork Technologies for QoS Control", IEICE Trans. Commun.,Sep. 2006.*
International Search Report of PCT/KR2010/005140, dated Apr. 25, 2011.
Kim, Sungwook, et al., "Adaptive Overlay Network Management Algorithms for QoS sensitive Multimedia Services", IJIPS, Feb. 2007, pp. 81-86, vol. 14-C, No. 1.
Murase, Tutomu, et al., "Overlay Netweork Technologies for Qos Control", IEICE Trans. Commun., Sep. 2006, pp. 2280-2291, vol. E89-B, No. 9.

* cited by examiner

*Primary Examiner* — Vivek Srivastava
*Assistant Examiner* — Sibte Bukhari
(74) *Attorney, Agent, or Firm* — Sughrue Mion, PLLC

(57) ABSTRACT

Provided is a network management method of a network manager. The network management method includes monitoring events including state information of a managed element wherein the events are published by the managed element included in a network, and generating commands for an action performed in the managed element according to the events, wherein the events are subscribed by the network manager managing the network.

10 Claims, 10 Drawing Sheets

METHOD FOR MANAGING NETWORK AND FOR PROVIDING SERVICE QOS

TECHNICAL FIELD

Exemplary embodiments of the present invention relate to a method for managing networks and providing service QoS and, more particularly, to a network management method for a network manager, a managed element, and an overlay network, and a service QoS providing method of an overlay network.

BACKGROUND ART

In general, a Simple Network Management Protocol (SNMP) is used to manage routers and switches of a typical network. The SNMP is a protocol for information exchanged between network devices in order to manage a network. A SNMP agent mounted at a router or a switch transmits a device state and a network state to a SNMP manager. The SNMP manager checks a traffic amount of each port of a network device, an error state generated in data transmission, and unused ports using the information transmitted from the SNMP agent.

Although the SNMP is a simple protocol and widely used to manage a network, the SNMP has several drawbacks. The SNMP manager regularly performs a polling process to collect data from a SNMP agent. Through the polling processes, the SNMP manager collects information on network devices. Such polling processes increase an overall traffic amount of a network. Thus, an overall network performance may be deteriorated due to traffic increment. Further, some of information on network devices may be lost during transmission due to data traffic congestion. However, such lost information may not be recognized by the SNMP manager or the SNMP agent.

In order to overcome such drawbacks of the SNMP, a TRAP technology was intruded. The TRAP technology is an asynchronous communication scheme that enables a SNMP agent to transmit critical network states to a SNMP manager such as when a network device is turned on and off or when a specific port becomes malfunctioned.

Since the TRAP technology is a User Datagram Protocol (UDP) based technology, the TRAP technology does not require acknowledgement for receiving information on network states. Due to absence of receipt acknowledgement, the TRAP technology has an unreliability problem in data transmission. Further, a man power is required to manage a network in order to manage a network according to network state information. The requirement of man power increases a network managing cost. Also, a system availability problem may be arisen because network error is not handled in real time.

DISCLOSURE

Technical Problem

An embodiment of the present invention is directed to a network management method for automatically managing a network in real time without a network manager.

Another embodiment of the present invention is directed to a network management method for providing a network management service using an overlay network.

Another embodiment of the present invention is directed to a method for providing service QoS in an overlay network when a service is provided through an overlay network.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

Technical Solution

In accordance with an embodiment of the present invention, a network management method of a network manager includes monitoring events including state information of a managed element wherein the events are published by the managed element included in a network, and generating commands for an action performed in the managed element according to the events, wherein the events are subscribed by the network manager managing the network.

In accordance with another embodiment of the present invention, a network management method of a managed element included in a network includes generating events for state information of the managed element, and performing operations according to commands published by a network manager, wherein the commands are generated by the network manager according to the events and the commands are subscribed by the managed element.

In accordance with another embodiment of the present invention, a method for managing a network of an overlay network includes selecting a service among network management services provided from a service provider according to a predetermined service QoS in response to a request of a network manager, providing the selected service to the network manager, and performing the service QoS and monitoring whether the provided service is matched with the serviced QoS or not.

In accordance with another embodiment of the present invention, a method for providing a service QoS of an overlay network includes configuring a service QoS including a service related QoS about services performed in an overlay network and a transport related QoS, searching a service according to the service QoS using the service QoS, performing the service related QoS and transmitting the transport related QoS to a service provider that provides the service, and monitoring whether the providing of the searched service is matched with the service QoS.

Advantageous Effects

A network management method in accordance with embodiments of the present invention provides a network management service using events transmitted or received in real time. Therefore, using the network management method in accordance with embodiments of the present invention, a network can be automatically managed in real time without a network manager.

Further, using the network management method in accordance with an embodiment of the present invention, a network management service can be provided using an overlay network and Service QoS can be provided in an overlay network.

BEST MODE

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Figure 1:
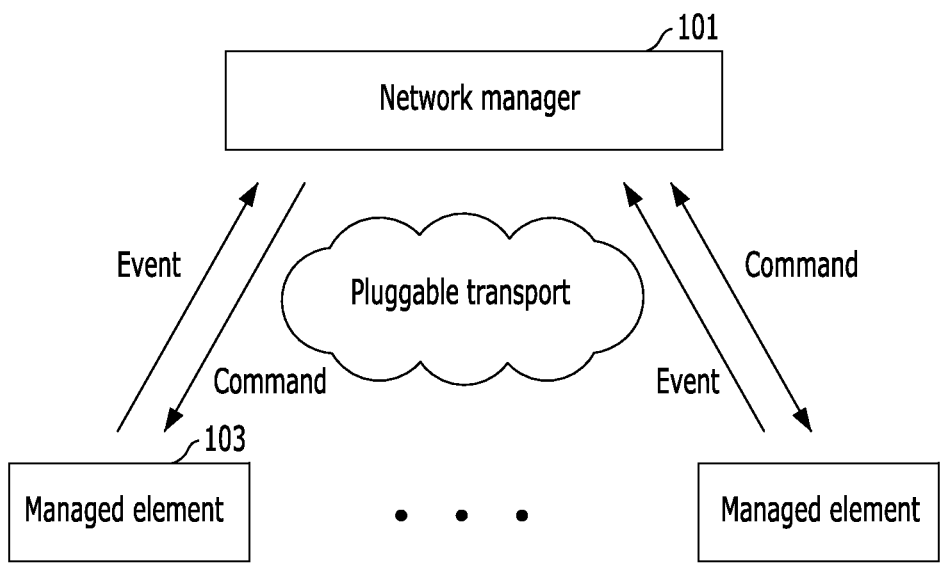
FIG. 1 is a diagram illustrating a network management system in accordance with an embodiment of the present invention.

FIG. 1 is a diagram illustrating a network management system in accordance with an embodiment of the present invention.

As shown in FIG. 1, the network management system in accordance with an embodiment of the present invention includes an autonomic network manager 101 and at least one of managed elements. The autonomic network manager 101 generates commands for the managed elements 103 using state information on the managed elements 103. The state information is asynchronously transmitted from the managed elements 103. Then, the automatic network manager 101 transmits the commands to the managed elements 103 to manage the managed elements 103.

The network management system in accordance with an embodiment of the present invention employs a Data Distribution Service (DDS) defined in Object Management Group (OMG). The Data Distribution Service (DDS) supports a data publication/subscription based communication service to provide a real time data service. In the Data Distribution Service (DDS), published or subscribed data is asynchronously transmitted or received. That is, the DDS does not transmit data in response to a data transmission request. The Data Distribution Service (DDS) transmits a generated event regardless of a data transmission request.

For example, the network manager 101 employs a DDS middleware. Thus, the network manager 101 subscribes events published by the managed element 103. Here, the events include state information of the managed elements 103. The managed element 103 also employs a DDS middleware. Thus, the managed element 103 subscribes commands that are published by the network manager 101 according to an event. When the managed element 103 becomes malfunctioned, an event asynchronously published by the managed element 103 is transmitted to the network manager 101 and the command asynchronously published by the network manager 101 is transmitted to the managed element 103.

That is, the network manager 101 in accordance with an embodiment of the present invention can asynchronously receive state information from the managed element 103. In other words, the network manager 101 in accordance with an embodiment of the present invention can receive the state information of the managed element 103 in real time. Therefore, a network management service can be provided to the managed element 103 in real time. Further, the network manager 101 generates a command to perform a predetermined operation in the managed element 103 and transmits the generated command to the managed element 103. Therefore, an autonomic network management service can be provided for managing a network without network managers.

In addition, the DDS supports a pluggable transport. Therefore, a DDS based system can set up a QoS of a transport layer according to an application service performed in a DDS based system. That is, the DDS based system can use a protocol or a communication method such as UDP, IP, and Ethernet at a transport layer and can set up a QoS according to a used transport layer.

That is, using the network management method in accordance with an embodiment of the present invention, it is possible to provide a flexible network management system and to assure the reliability of a transport layer according to QoS setting regardless of a transport protocol used. In more detail, the network management method in accordance with an embodiment of the present invention supports acknowledgment to data transmission or data reception between a network manager and a managed element according to QoS setting regardless of a protocol of a transport layer. Also, the network management method in accordance with an embodiment of the present invention supports determining whether a managed element is in live or not according to QoS setting regardless of a protocol of a transport layer. Therefore, the network management method in accordance with an embodiment of the present invention assures the service reliability.

As described above, the managed element 103 performs operations according to commands published by the network manger 101. Therefore, the managed element 103 can recover from a generated fault and change system information.

Figure 2:
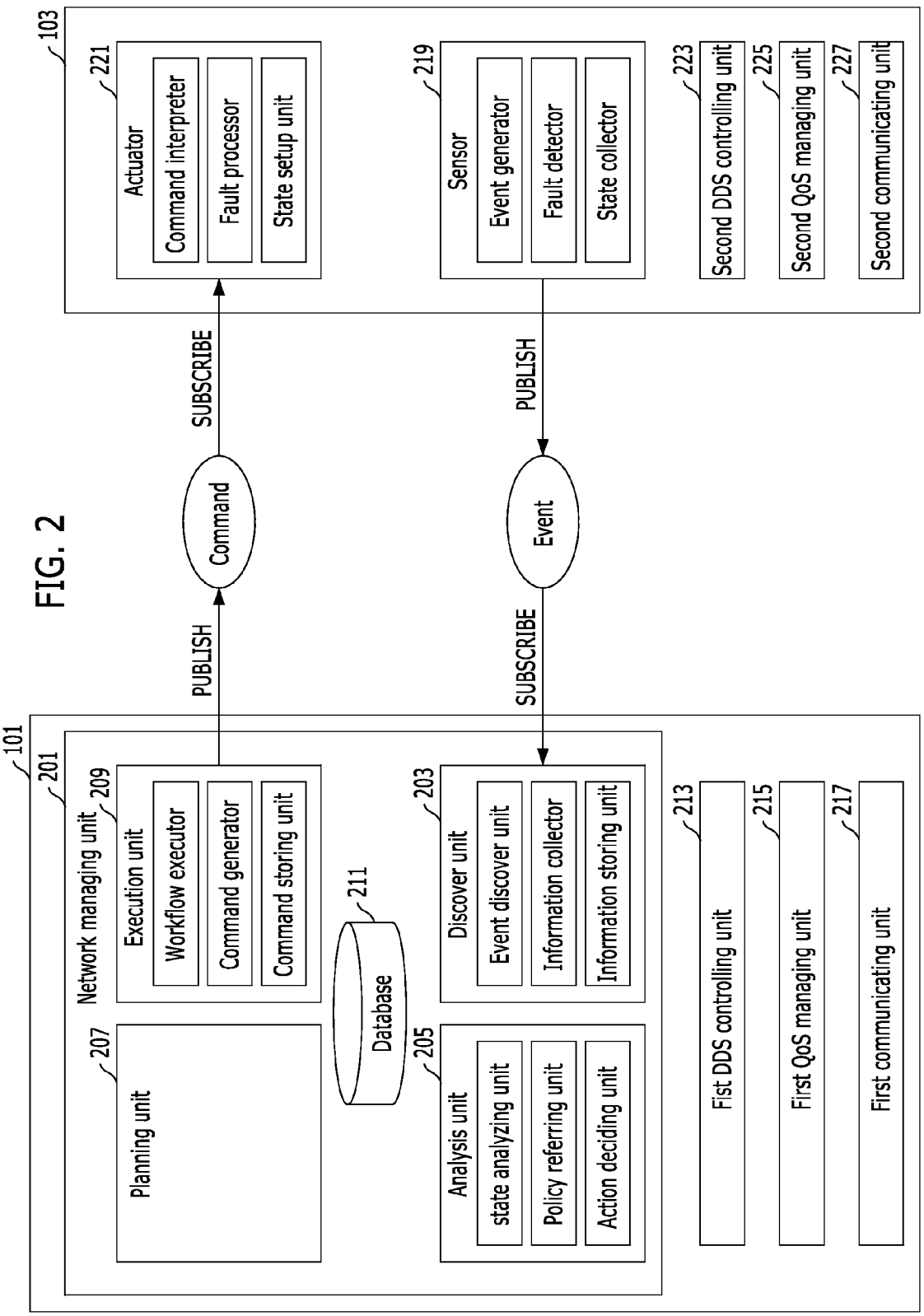
FIG. 2 a block diagram illustrating a network management system in accordance with an embodiment of the present invention.

FIG. 2 is a block diagram illustrating a network management system in accordance with an embodiment of the present invention. In FIG. 2, an event published by the managed element 103 is an event subscribed by the network manager 101, and a command published by the network manager 101 is a command subscribed by the managed element 103. The network manager 101 may be mounted at a central server of a network provider providing a network. Alternately, the network manager 103 may be mounted at an additional server.

As shown in FIG. 2, the network manager 101 includes a network managing unit 201, a first DDS controlling unit 213, a first QoS managing unit 215, and a first communicating unit 217. The managed element 103 includes a sensor 219, an actuator 221, a second DDS controlling unit 223, a second QoS managing unit 225, and a second communicating unit 227.

The first and second DDS controlling units 213 and 223 set up data to be published or subscribed according to a user setting. According to the user setting, the first DDS controlling unit 213 may be set up to publish a command and to subscribe an event and the second DDS controlling unit 223 may be set up to publish an event and to subscribe a command.

Figure 3:
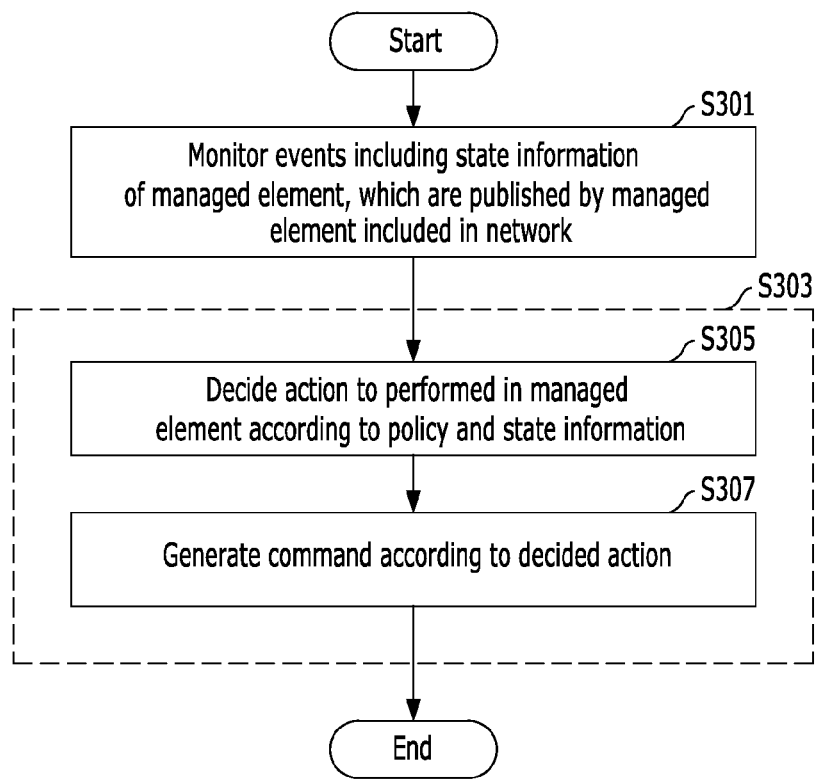
FIG. 3 is a flowchart illustrating a network management method of a network manager 101 in accordance with an embodiment of the present invention.

The first and second communicating units 217 and 227 perform a communication operation for transmitting and receiving data. The first and second communicating units 217 and 227 also transmit and receive events and commands. The first and second communicating units 217 and 227 discover a target object to communicate, generate events and commands in a form of a message or a packet, and transmit the generated events and commands. For instance, each one of the first and second communicating units 217 and 227 may include a discover unit for discovering a target object to communicate, a message generator for generating a message, and a message transceiver for transmitting and receiving a message. For convenience, FIG. 3 illustrates that events and commands are transmitted and received between the network managing unit 201 and a sensor and actuator 219 and 221. However, such events and commands are transferred between the first and second communicating units 217 and 227.

The network managing unit 201 monitors events published by the managed element 103. An event includes state information of the managed element 103. For example, the state information may be performance information, fault information, or system information of the managed element. The network managing unit 201 generates commands for controlling a managed element according to an event.

Particularly, the network managing unit 201 may decide an action according to a predefined policy. Here, the action denotes operations to be performed in a managed element. Further, the network manager may generate commands according to the decided action. The predefined policy may be a policy defined by a network provider that provides a network management service, a policy input from an external system, or a policy stored in a database. The network managing unit 201 may generate commands based on a stored policy.

The network managing unit 201 according to an embodiment of the present invention may further include a discover unit 203, an analysis unit 205, a planning unit 207, an execution unit 209, and a database 211.

The discover unit 203 may include an event discover unit, an information collector, and an information storing unit. The event discover unit discovers an event published by a managed element 103. The information collector collects performance information, state information, and connection information of a managed element. The information storing unit stores the collected information at the database 211.

The analysis unit 205 may include a state analyzing unit, a policy referring unit, and an action deciding unit. The state analyzing unit analyzes the current state of the managed element 103 based on the stored information. The policy referring unit refers a policy stored in the database 211. The action deciding unit decides an action for a managed element 103 according to the current state of the managed element 103.

The planning unit 207 creates a management plan for a managed element 103 by generating a work flow to process an event according to the decided action of the managed element 103, which is decided by the analysis unit 205.

The execution unit 209 may include a workflow executor, a command generator, and a command storing unit. The workflow executor executes the workflow to call an interface of a managed element 103 using the workflow generated by the planning unit 207. The command generator generates commands according to the decided action of the managed element 103. The command storing unit stores a calling history and a generated command at the database 211.

That is, the network managing unit 201 provides an event monitoring service, an event analysis service, a planning service, and a control service for controlling a managed element 103 according to a command.

The first and second QoS managing units 215 and 225 set up a QoS according to published or subscribed data or a provided service. The setup QoS varies according to a transport layer. That is, the first and second QoS managing units 215 and 225 set up a QoS as a reliability QoS or as a liveness QoS. Under the reliability QoS, the network management system provides an acknowledgement for receiving transmitted data in order to assure reliability in data transmission reliability. Under the liveness QoS, the network management system determines whether a target object to communicate is active or not. As described above, the network management system in accordance with an embodiment of the present invention assures the reliability in data transmission and determines whether a target object to communicate is active or not. An acknowledgement (ACK/NACK) method may vary according to a network bandwidth.

Further, the first and second QoS managing units 215 and 225 dynamically change a QoS according to a transport layer. Therefore, applications provided from a network manager may be provided regardless of a transport layer. Moreover, a QoS can be dynamically provided according to applications.

For example, the first and second QoS managing units 215 and 225 may include a QoS setup unit and a QoS processor. The QoS setup unit sets up a QoS according to published or subscribed data or a service. The QoS processor changes a QoS setup to a service according to a transport layer and assigns reliability to a network management system according to the setup QoS.

Hereinafter, the network management system in accordance with an embodiment of the present invention, which is set up with a reliability QoS or a liveness QoS by the first and second QoS managing units 215 and 225, will be described in detail.

The first communicating unit 215 generates an ACK/NACK packet or a liveness packet according to a setup QoS and transmits the generated packet to a managed element 103. The ACK/NACK packet is generated under the reliability QoS in order to assure reliability in data transmission. The liveness packet is generated under the liveness QoS to determine whether a managed element 103 is active or not.

In response to the ACK/NACK packet from the network manager 101, the managed element 103 transmits an acknowledgement or a non-acknowledgement (ACK/NACK) for receiving a command to the network manager 101. In response to the liveness packet from the network manager 101, the managed element 103 transmits a response message within a predetermined time (lease_duration). In case of data transmission error, the data may be retransmitted.

The second communicating unit 227 may transmit an ACK/NACK packet or a liveness packet to a network manager 101. The network manager 101 may also transmit a response message for the ACK/NACK packet or the liveness packet to a managed element 103.

Meanwhile, the managed element 103 may include at least one of managed resources. The managed resource may be a router or a switch which is required to drive application of the network manager 101. Also, the managed resource may be a storage which is required to form a network. A sensor 219 collects state information of a managed element including managed resources and generates an event including the state information. Particularly, the sensor 219 may include a state collector, a fault detector, and an event generator. The state collector collects state information of a managed element 103. The fault detector detects a fault generated in a managed element based on the collected state information. The event generator generates an event including the state information according to the generated fault.

The actuator 221 performs a predetermined action according to a command of the network manager 101. Therefore, when a fault is generated in the managed element 103, the managed element 103 performs a predetermined action according to a command to recover from the generated fault. Particularly, the actuator 221 may include a command interpreter, a fault processor, and a state set up unit. The command interpreter interprets a command. The fault processor handles the fault according to the command interpretation result. The state setup unit changes a system setting value according to the command interpretation result.

Since the second DDS controlling unit 223, the second QoS managing unit 225, and the second communicating unit 227 are already described, the detail description thereof is omitted herein.

Table 1 shows events published by a managed element 103, decision of the network manager 101 according to the event, and commands published by the network manager 101.

TABLE 1

| Event | Current state: switch, NIC information such as a bandwidth and vender, port information such as the number of ports, the number of frames transmitted per each port, the number of collisions, and the number of CRC error, and buffer information such as a buffer size and the number of buffers | Fault: a part of traffic is not processed when traffic of L2 switch increases, port information |
|---|---|---|
| Network manager | When a buffer size is too small, a network manager may expand the size of the buffer. | When one of ports is malfunctioned after inquiring port information of a L2 switch, a network manager transfers traffics to other ports. |
| Commands | Changing a buffer to a predetermined value. | Changing a port |

FIG. 3 is a flowchart illustrating a network management method of a network manager 101 in accordance with an embodiment of the present invention.

Referring to FIG. 3, the network management method in accordance with an embodiment of the present invention will be described in detail, hereinafter.

At step S301, a network manager 101 monitors events. The events are published by a managed element 103 included in a network and includes state information of the managed element 103. Here, the events are subscribed by the network manager 101. That is, the network manager 101 monitors and discovers events transmitted from the managed element 103.

At step S303, the network manager 101 generates a command for an action to be performed in the managed element 103 according to an event. That is, the network manager 101 generates a command for a necessary operation to be performed in the managed element 103 according to a state of the managed element, for example, when the managed element becomes malfunctioned or when it is necessary to change a system setup value of the managed element 103. Accordingly, the network manager 101 can manage and control the managed element by transmitting the generated command to the managed element 103.

In the step S303, the network manager 101 decides a predetermined action to be performed in the managed element according to a predetermined policy or the state information at step S305 and generates commands according to the decided operation at step S307.

Meanwhile, the network management method in accordance with an embodiment of the present invention may further include requesting an acknowledgement for receiving a command from the managed element according to a predetermined QoS. Or, the network management method in accordance with an embodiment of the present invention may further include requesting a management element to send a response to whether a managed element is active or not according to a predetermined QoS. That is, a managed element 103 may transmit an acknowledgement message to a network manager 101 after receiving a command published by the network manager 101 according to a request from the network manager 101. Further, a managed element 103 may transmit a response message of whether the managed element 103 is active or not to a network manager 101 according to the predetermined QoS. Here, the predetermined QoS may be defined by the network manager 101.

The network manager 101 may provide applications of the network manager 101 regardless of a network transport layer by changing the predetermined QoS according to a protocol of the network transport layer.

Figure 4:
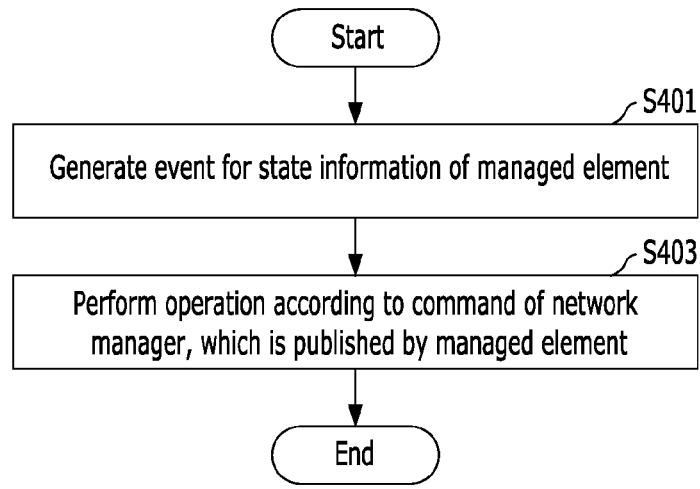
FIG. 4 is a flowchart illustrating a network management method of a managed element 103 in accordance with an embodiment of the present invention.

FIG. 4 is a flowchart illustrating a network management method of a managed element 103 in accordance with an embodiment of the present invention.

Referring to FIG. 4, the network management method in accordance with the present embodiment will be described in detail.

At step S401, a managed element 103 generates events for state information of the managed element 103. Particularly, the managed element 103 may monitor states of the managed element 103 and generate events including state information according to the monitoring result.

At step S403, the managed element 103 performs operations according to commands published by a network manager 101. Here, the commands are generated by the network manager 101. The commands are performed in the managed element 103. The commands are subscribed by the managed element 103.

As described above, in the network management method of the managed element 103, the managed element 103 receives commands from the network manager 101 and performs operations for handling a fault state and changing a system setting, thereby managing a network.

Meanwhile, the network management method in accordance with an embodiment of the present invention may further include receiving an ACK request message for receiving commands from a network manager 101 and transmitting an ACK message to the network manager 101 according to a predetermined QoS or receiving a response request message for determining whether a managed element 103 is active or not from a network manager 101 and transmitting a response to the network manger 101 according to a predetermined QoS. Here, the predetermined QoS may be set up by the managed element 103.

Figure 5:
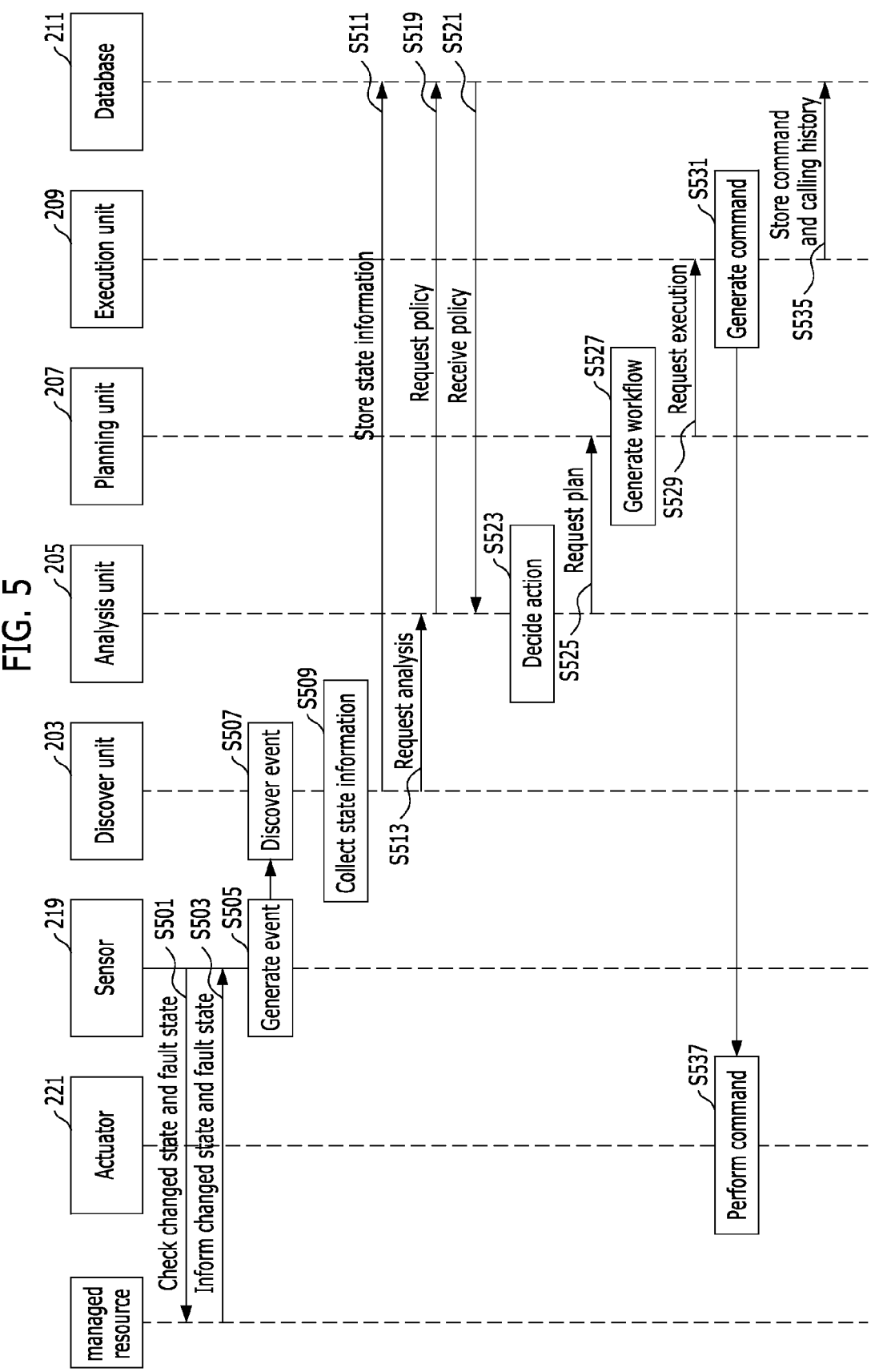
FIG. 5 is a diagram illustrating the network management methods of FIGS. 3 and 4 in detail.

FIG. 5 is a diagram illustrating the network management methods of FIGS. 3 and 4 in detail. Hereinafter, a network management service scenario in accordance with an embodiment of the present invention will be described referring to FIG. 5. As described in FIG. 3, an event published by a managed element 103 is an event subscribed by a network manager 101. Further, a command published by the network manager 101 is a command subscribed by the managed element 103.

At step S501, a sensor 219 monitors a changed state and a fault state of managed resources included in a managed element 103. At step S503, the managed element 103 informs the sensor 219 of the monitoring result such as the changed state and the fault state of the resources included the managed element 103. At step S505, the sensor 219 generates an event including state information using the monitoring result. At step S507, a discover unit 203 discovers the generated event. At step S509, the discover unit 203 collects the state information. At step S511, a database 211 stores the collected state information. At step S513, the database 203 requests an analysis unit 205 to analyze the state information. At step S519, the analysis unit 205 requests a policy to the database 211. At step S521, the analysis unit 205 receives the requested policy from the database 211. At step S523, the analysis unit 205 decides an action, which is a predetermined operation performed in a managed element, using the analysis result and the policy. At step S525, the analysis unit 205 requests a planning unit 207 to send a plan. At step S527, the planning unit 207 generates a workflow according to the plan in response to the request from the analysis unit 205. At step S529, the planning unit 207 requests an execution unit 209 to execute the workflow. At step S531, the execution unit 209 generates commands according to the workflow. At step S535, the actuator 211 stores a calling history for an interface to the database 211. At step S537, the actuator 221 interprets the commands and performs predetermined operations according to the commands.

Figure 6:
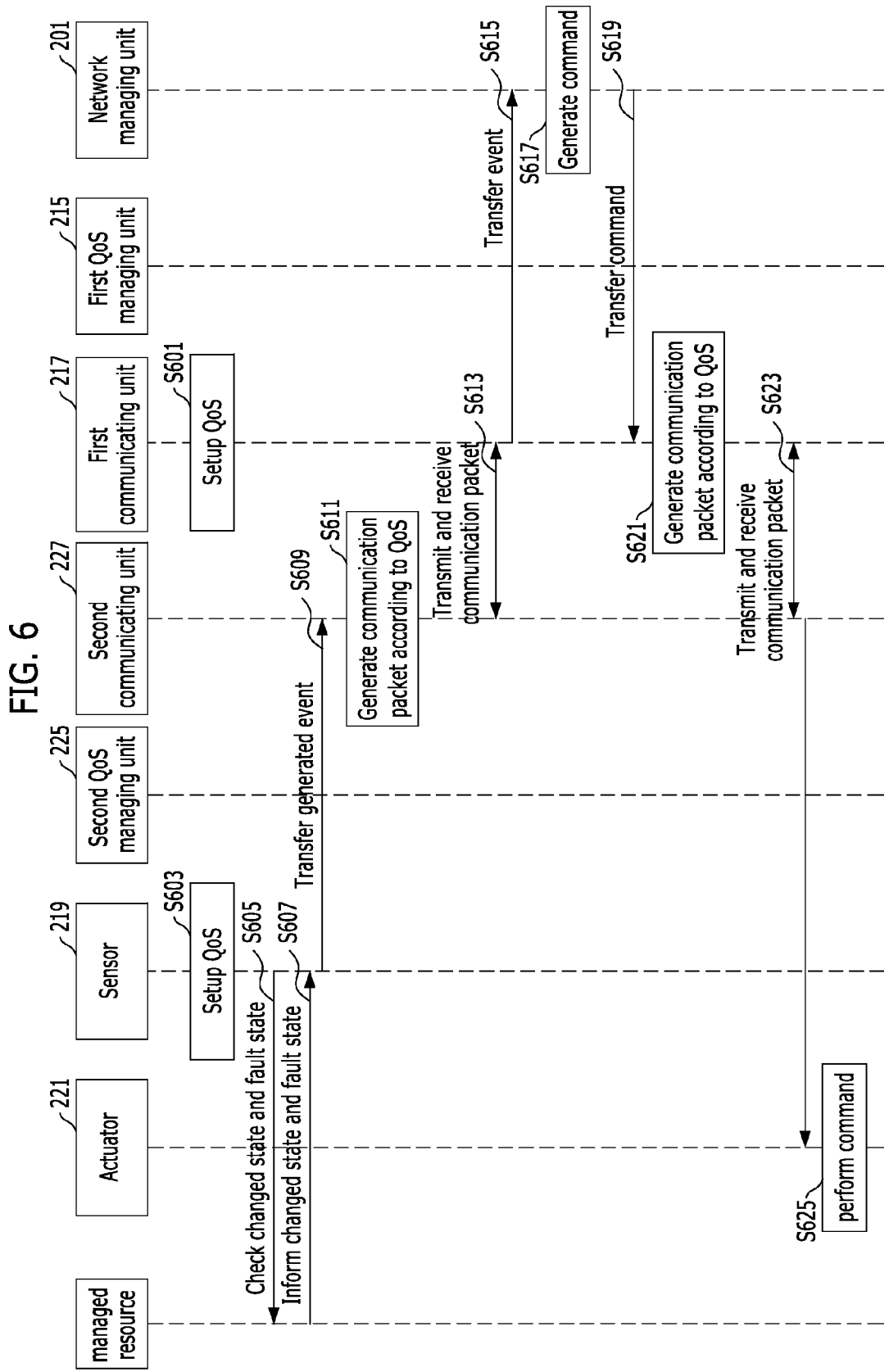
FIG. 6 is a diagram for illustrating the network management methods shown in FIGS. 3 and 4 in view of a QoS.

FIG. 6 is a diagram for illustrating the network management methods shown in FIGS. 3 and 4 in view of a QoS. A QoS required at a transport layer may be set up through applications performed in a network manager 101 and a managed element 103. As shown in FIG. 3, an event published by a managed element 103 is an event subscribed by the network manager 101. Further, a command published by a network manager 101 is a command subscribed by a managed element 103.

At steps S601 and S603, a reliability QoS and a liveness QoS are set up to guarantee reliability in data transmission between a network manager 101 and a managed element 103 and to confirm whether a target object to communicate is active or not. The first and second QoS managing units 215 and 225 may set up a QoS when the network manager 101 and the managed element 103 publish and subscribe events and commands.

For example, the first and second QoS managing units 215 and 225 may set up QoS as 'reliability QoS=reliable' and 'liveness QoS=automatic(lease_duration included)'. The network manager 101 and the managed element 103 transmit and receive an ACK/NACK packet or a liveness packet according to the setup QoS. Further, the network manager 101 and the managed element 103 transmit and receive a response of the ACK/NACK packet and the liveness packet.

At step S605, the sensor 219 monitors a changed state or a fault state of managed resources. At step S607, the sensor 219 receives a changed state notice and a fault state notice from the managed resources. At step S609, the sensor 219 transfers events including state information of managed resources to the second communicating unit 227 and the second communicating unit 227 generates a communication packet according to a QoS. The communication packet includes an event, an ACK/NACK packet, and a liveness packet. At step S613, the second communicating unit 227 transmits the communication packet to the first communicating unit 217 and receives a response thereof from the first communicating unit 217.

At step S615, the first communicating unit 217 transfers an event to the network managing unit 201 in order to transmit the event to the managed element 103. At step S617, the network managing unit 201 generates commands for the managed element 103. The first communicating unit 217 generates a communication packet including the command from the network managing unit 201 according to a QoS. The communication packet includes a command, an ACK/NACK packet, and a liveness packet. The first communicating unit 217 transmits the communication packet to the second communicating unit 227 and receives a response thereof from the second communicating unit 227 at step S623.

At step S623, the second communicating unit 227 transmits a command to the actuator 221. At step S625, the actuator 221 performs a predetermined operation according to the command.

Meanwhile, when a transport layer of the network manager 101 and the managed element 103 is the Ethernet, the communication packet may be operation, administration, and maintenance (OAM) packets. As described above, it is prefer to set up a QoS of the network manager 101 and the managed element 103 identically.

Meanwhile, a network management service provided by a network manager may be provided by a network device or a dedicated service provider according to a service. That is, a network provider that provides a network may directly provide a network management service using a network manager. Further, a network device or a dedicated service provider may provide a network management service according to a service. When the network device or the dedicated service provider provides the network management service, the network management service may be provided as a web service at an open platform environment such as web 2.0. Particularly, the network management service may be provided using an overlay network. Hereinafter, a network management method using an overlay network will be described in detail.

Figure 7:
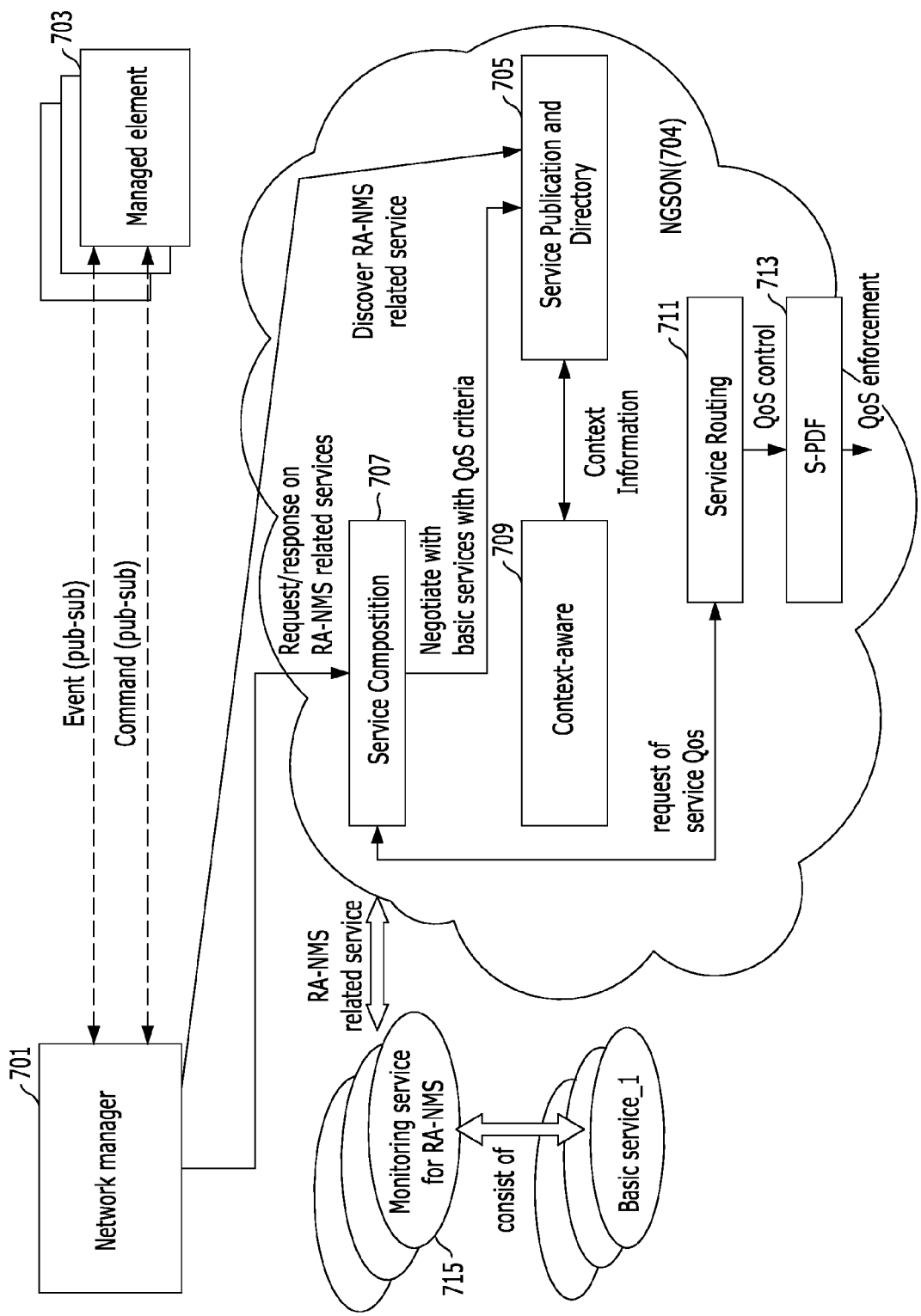
FIG. 7 is a diagram illustrating a network management system in accordance with another embodiment of the present invention.

FIG. 7 is a diagram illustrating a network management system in accordance with another embodiment of the present invention. FIG. 7 illustrates a network management system using an overlay network.

Referring to FIG. 7, the network management system in accordance with another embodiment of the present invention includes a network manager 701, a managed element 703, and an overlay network 704. The overlay network 704 is a virtual network built on a physical network. For example, the overlay network 704 may be a Next Generation Service Overlay Network (NGSON) employing IEEE P1903.

The managed element 703 corresponds to the managed element 103 of FIG. 1. However, the network manager 701 does not include a network managing unit 201 unlike the network manager 101 of FIG. 1. For example, the network manager 701 may be a Remote Autonomous Network Management service (RA-NMS) provider. The network manager 701 provides a service through the overlay network 704.

For instance, a Remote Autonomous Network Management service (RA-NMS) provided through the overlay network 704 is published from the managed element. The Remote Autonomous Network Management service (RA-NMS) may include a monitoring service (service provided by a discovery unit 203) for monitoring events including state information of the managed element 703, an analysis service (service provided by an analysis unit 205) for analyzing a state of the managed element 703 according to an event, a scheduling service (service provided by a scheduler 207) for generating a flowchart according to an operation performed in the managed element 703, and a control service (service provided by an execution unit 209) for generating commands for the operation performed in the managed element 703 according to the flowchart and performing the operation in the managed element 703 according to the command.

As described above, the network management service may be provided by a dedicated service provider that dedicatedly provides a network service. The overlay network 704 is present above a low-level network of the service provider that provides the network management service. The overlay network 704 may provide a network management service published from the low-level network as a composition service or a basic service to the network manager 701 according to a request of the network manager 701.

That is, the overlay network 704 selects a service among network management services provided from a service provider based on a predefined service QoS in response to a request of the network manager 701. The overlay network 704 performs the selected service and provides the selected service to the network manager 701. The overlay network 704 performs the service QoS and monitors whether the provided service is matched with the service QoS or not.

Therefore, the network manager 701 discovers an event of the managed element 703 and requests commands to the overly network 704. Then, the overlay network 704 provides commands to the network manager 701 according to the event. The network manager 701 publishes the commands from the overlay network 704 to the managed element 703.

Meanwhile, the predetermined service QoS may be a service QoS set up by the network manager 701. The predetermined service QoS presents requirements defined in an agreement between the network manager 701 and the service provider. In the overlay network 704, the service QoS is for guaranteeing a general performance (end-to-end). The service QoS may be classified into a service related QoS about a service performed in the overlay network 704 and a transport related QoS. The service related QoS denotes requirements to constituent entities related to a service. That is, the service related QoS relates to service availability, accessibility, a response time, and a processing amount. The transport related QoS denotes requirements related to transport related constituent entities. The transport related QoS relates to a bandwidth, delay, and packet loss amount. That is, the transport related QoS is a QoS related to a low-level network of a service provider or related to a network connected to the overlay network 704. For example, it is necessary that constituent entities of the overlay network 704 and the low-level network satisfy an execution time in order to satisfy a service response time QoS performed in the overlay network 704.

Hereinafter, the overlay network 704 will be described in detail.

As shown in FIG. 7, the overly network 704 a service publication and directory unit 705, a service composition unit 707, a context-aware unit 709, a service routing unit 711, and a service policy decision function 713.

The service publication and directory unit 705 stores a service name provided from a service provider and interface information to communicate with the network manager 701. The service publication and directory unit 705 provides a service discovery result according to a request of the network manager 701. For example, a service discovered according to a request of the network manager 701 is a composition service combined with a plurality of basic services according to a service QoS. For example, such a service may be a monitoring service 715. The service publication and directory unit 705 discovers a plurality of basic services included in the composition service. Here, the discovered basic service needs to be provided to satisfy a service QoS. The service publication and directory unit 705 may negotiate with the service policy decision function 713 to select a service according to a service QoS. The service policy decision function 713 controls a service QoS.

The service composition unit 707 performs a service discovered from the service publication and directory unit 705. The service composition unit 707 performs a composition service discovered from the service publication and directory unit 705 and requests the service publication and directory unit 705 to discover basic services included in the composition service. Further, the service composition unit 707 requests the service publication and directory unit 705 to negotiate with a service QoS. The service composition unit 707 requests a plurality of selected basic services to a service provider and performs a composition service combined with a plurality of basic services provided from the service provider according to a request, thereby providing the composition service to the network manager 701.

The context-aware unit 709 provides context information of a network management service. The service composition unit 707 can select a service using the context information. The context information includes a user context such as environmental restriction, a service context such as a service QoS requirement, a network context such as a delay time and a transmission speed, and a device context such as device capability.

The service routing unit 711 routes data transmitted or received in the overlay network according to a service QoS and context information. The service policy decision function 713 performs a service QoS and manages a QoS according to a provided service. That is, the service policy decision function 713 performs a service QoS, monitors a process of performing a service in the network manager 701, and determines whether the provided service is satisfied according to a service QoS. For example, the service policy decision function 713 orders network equipment related to a transport to perform a QoS according to a transport related QoS.

Figure 8:
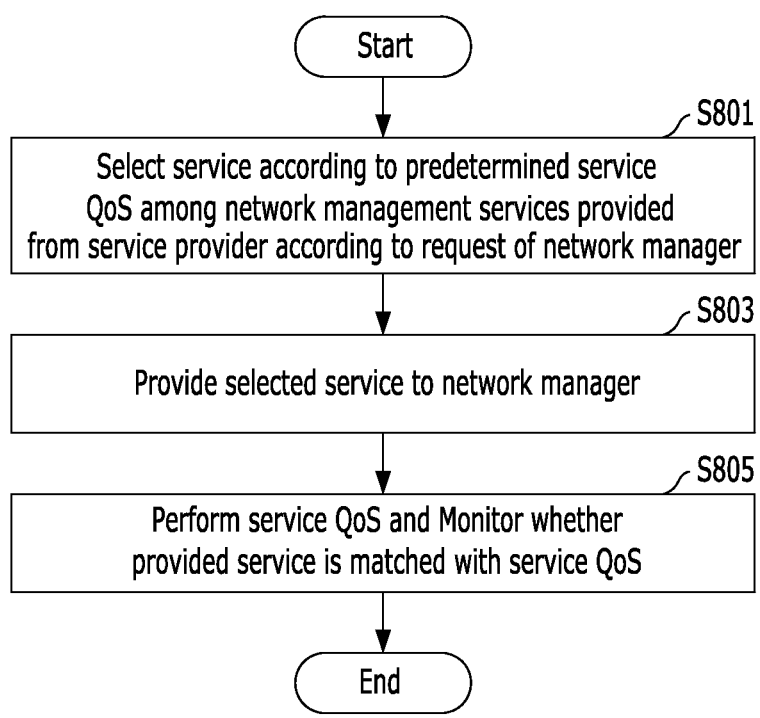
FIG. 8 is a flowchart illustrating a network management method of an overlay network 704 in accordance with another embodiment of the present invention.

FIG. 8 is a flowchart illustrating a network management method of an overlay network 704 in accordance with another embodiment of the present invention.

Referring to FIG. 8, the network management method of the overlay network 704 in accordance with another embodiment of the present invention will be described in detail.

At step S801, the overlay network 704 selects a service among network management services provided from a service provider according to a predetermined service QoS in response to a request of the network manager 701. Here, a service discovered according to a request of the network manager may be a composition service combined with a plurality of basic services. The overlay network 704 selects a composition service according to a service QoS and selects a plurality of basic services included in the composition service according to a service QoS. The overlay network 704 may select a service additionally using context information about a service.

At step S803, the overlay network 704 provides the selected service to the network manager 701. The overlay network 704 requests a plurality of selected basic services to a service provider and provides a network management service to the network manager 701 by performing a network management service published by the service provider in response to the request.

At step S805, the overlay network 704 performs a service QoS and monitors whether or not the service provided from the network manager 701 is satisfied by the service QoS.

Here, the network management service may be provided to an overlay network through publishing the network management service from a service provider of a low-level network as described above.

Figure 9:
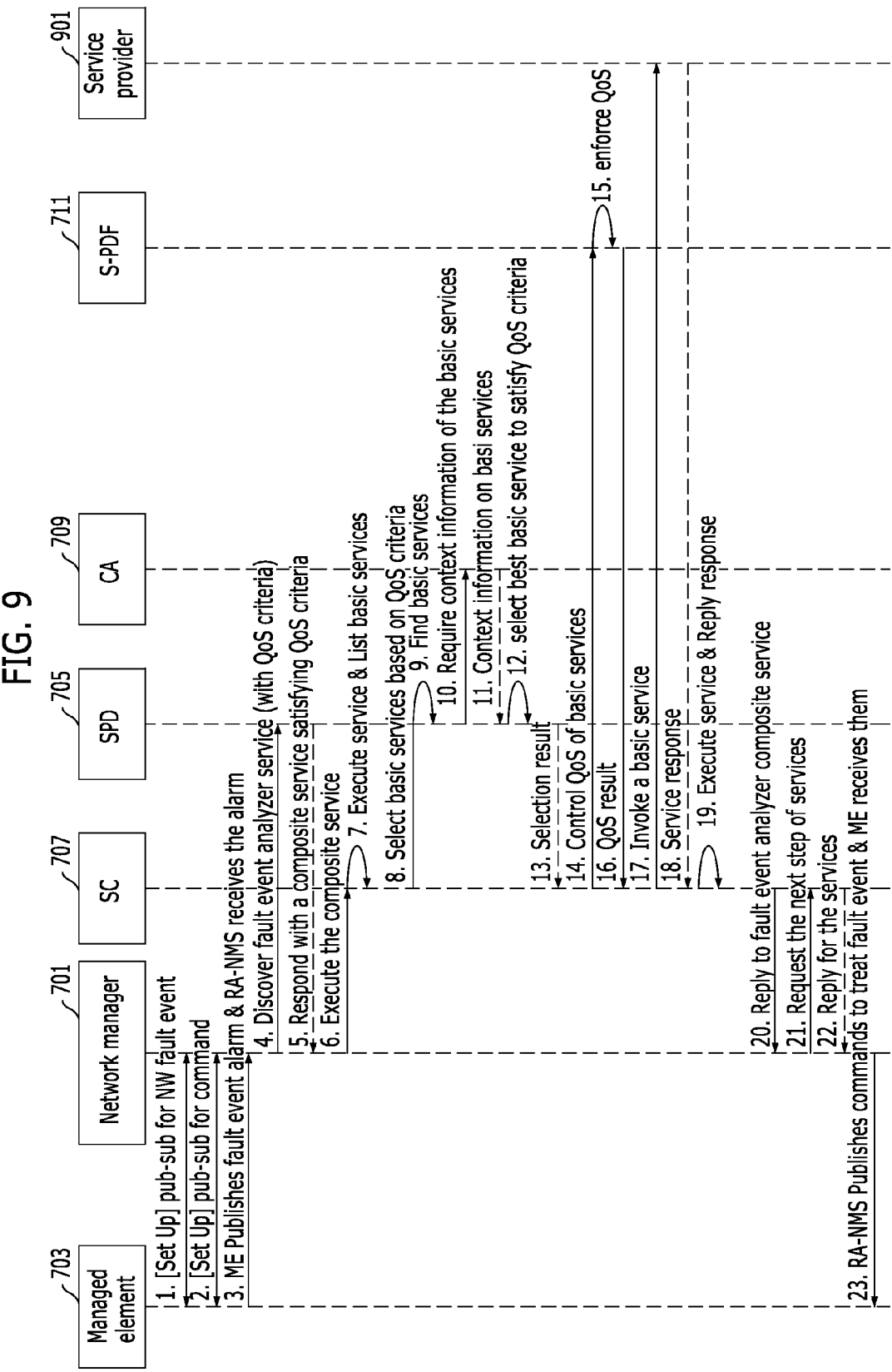
FIG. 9 is a diagram for illustrating a network management method of an overlay network 704 of FIG. 8 in detail.

FIG. 9 is a diagram for illustrating a network management method of an overlay network 704 of FIG. 8 in detail. Referring to FIG. 9, a network management service scenario in according to an embodiment of the present invention will be described in detail.

1. According to a publication-subscription (pub-sub) communication method, the network manager 701 subscribes a fault event related to a fault state of the managed element 703, which is published from the managed element 703.

2. According to the pub-sub communication method, the managed element 703 subscribes a control command for the managed element 703, which is published from the network manager 701.

3. The managed element 703 generates and publishes a fault event and the network manager 701 receives the fault event.

4. The network manager 701 requests the service publication and directory unit 705 to discover a composition service such as a monitoring service according to a service QoS.

5. The service publication and directory unit 705 discovers the composition service in response to the request and transmits the discovery result to the network manager 701 as response.

6. The network manager 701 requests the service composition unit 707 to perform the discovered composition service.

7. The service composition unit 707 performs the composition service and discovers a list of basic services included in the composition service.

8. The service composition unit 707 requests the service publication and directory unit 705 to select a basic service that satisfies the service QoS.

9. The service publication and directory unit 705 discovers a basic service that satisfies the service QoS.

10. The service publication and directory unit 705 requests context information for the basic service to the context-aware unit 709.

11. The context-aware unit 709 provides the requested context information to the service publication and directory unit 705.

12. The service publication and directory unit 705 selects a basic service that satisfies a service QoS.

13. The service publication and directory unit 705 provides the selection result to the service composition unit 707.

14. The service composition unit 707 requests the service policy decision function 713 to control a service QoS.

15. The service policy decision function 713 classifies the service QoS into a service related QoS and a transport related QoS and converts the transport related QoS to a network QoS. The service policy decision function 713 performs the network QoS.

16. The service policy decision function 713 response to the request of the service composition unit 707.

17. The service composition unit 707 requests a basic service to the service provider 901.

18. The service provider 901 provides a basic service to the service composition unit 707.

19. The service provider 901 performs a basic service.

20. The service provider provides the result of performing the basic service to the network manager 701.

21-22. The network manager 701 requests a next service such as further necessary services to the overlay network 704 and the overlay network 704 provides the requested necessary services. For example, in case of a monitoring service, the next service may be an analysis service.

23. The network manager 701 publishes a control command related to a fault state of a managed element.

Figure 10:
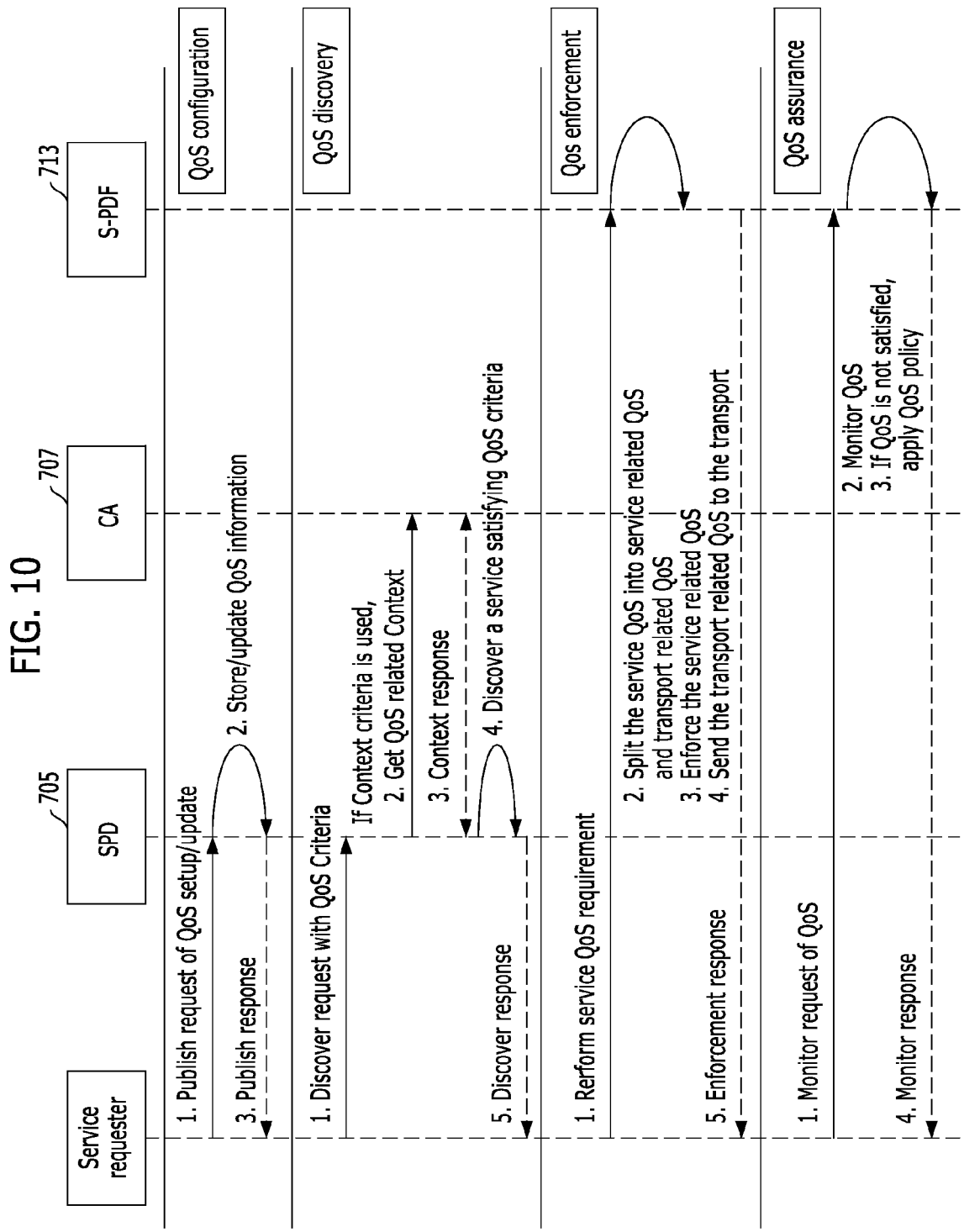
FIG. 10 is a diagram for illustrating a method for providing a service QoS in an overlay network 704 in accordance with an embodiment of the present invention.

FIG. 10 is a diagram for illustrating a method for providing a service QoS in an overlay network 704 in accordance with an embodiment of the present invention. The service QoS providing method of the overly network 704 of FIG. 10 may be applied not only to the above described network management system but also a system or a method providing other network service.

The service QoS providing method in accordance with an embodiment of the present invention includes a QoS configuration step, a QoS discovery step, a QoS enforcement step, and a QoS assurance step. FIG. 10 illustrates the service QoS providing method in accordance with an embodiment of the present invention when a service requester requests the overlay network 704 to provide a service QoS. However, requests of each step in the service QoS providing method may differ according to a design of a network 704. For example, QoS configuration may be requested by a service requester. QoS discovery, QoS execution, and QoS assurance may be requested by a controller of an overlay network 704.

<QoS Configuration Step>

1. A service requester requests service QoS configuration to a service publication and directory unit 705. According to the service QoS configuration request, service QoS information may be newly created or modified. Here, the service QoS may be described in a service level agreement (SLA).

2. The service publication and directory unit 705 stores the configured service QoS. The service QoS may be stored in a database.

3. The service publication and directory unit 705 transmits a response according to success or failure in the service QoS configuration to the service requester. In case of the service QoS configuration failure, error information is transmitted to the service requester.

<QoS Discovery Step>

1. A service requester requests the service publication and directory unit 705 to discover a service to according to a predetermined service QoS.

2. When the service discovery request of the service requester includes a context reference, the service publication and directory unit 705 requests service QoS related context information to the context-aware unit 709.

3. The context-aware unit 709 transmits the requested context information to the service publication and directory unit 705.

4. The service publication and directory unit 705 searches a service according to a service QoS. Here, the service publication and directory unit 705 generates a query based on the service QoS and sends the generated query to the data base storing services.

5. The service publication and directory unit 705 transmits the search result to the service requester. That is, the service publication and directory unit 705 transmits a response according to success or failure in searching a requested service to the service requester. In case of the failure, error information is transmitted to the service requester.

<QoS Enforcement Step>

1. A service requester requests a service policy decision function 713 to perform a service QoS.

2. The service policy decision function 713 classifies QoS into a service related QoS about services performed in the overlay network 704 and a transport related QoS in order to satisfy a general service QoS. That is, the service policy decision function 713 may convert the service related QoS to the transport related QoS.

3. The service policy decision function 713 performs the service related QoS performed in the overlay network 704.

4. The service policy decision function 713 transfers the transport related QoS to a service provider that provides services performed in the overlay network 704. That is, the transport related QoS information is transferred to the service provider.

5. The service policy decision function 713 transmits the performing result of the service related QoS to the service requester. That is, the service publication and directory unit 705 transmits a response according to success or failure in QoS enforcement to the service requester. In case of failure, error information is transmitted to a service requester.

<QoS Assurance Step>

1. A service requester requests a service policy decision function 713 to monitor a service QoS.

2. The service policy decision function 713 monitors a service QoS, collects and analyzes the monitoring result. That is, the service policy decision function 713 monitors whether the provided service is matched with a service QoS or not.

3. The service policy decision function 713 applies a predetermined QoS policy when a provided service is not satisfied according to a service QoS. That is, the service policy decision function 713 monitors whether the provided service is matched with the service QoS or not according to the predefined QoS. The service policy decision function 713 performs a service related QoS again and transmits the transport related QoS to the service provider when the QoS policy is applied.

4. The service policy decision function 713 transmits the monitoring result to the service requester. That is, the service publication and directory unit 705 transmits a response according to success or failure in monitoring to the service requester. In case of monitoring failure, error information is transmitted to the service requester.

Figure 11:
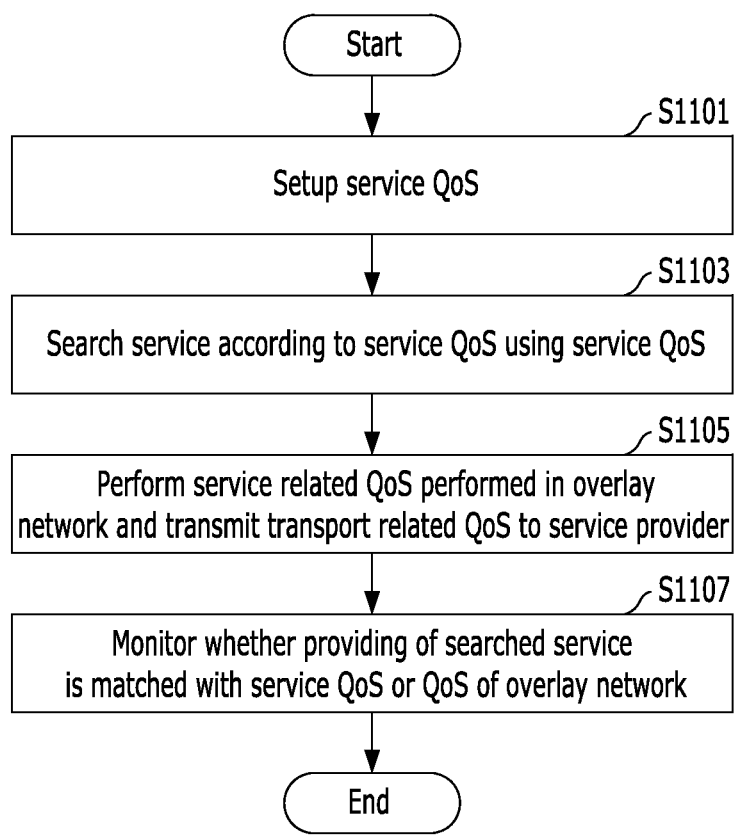
FIG. 11 is a flowchart illustrating a service QoS providing method of an overlay network 704 in accordance with an embodiment of the present invention.

FIG. 11 is a flowchart illustrating a service QoS providing method of an overlay network 704 in accordance with an embodiment of the present invention.

Referring to FIG. 11, the service QoS providing method of the overlay network 704 in accordance with an embodiment of the present invention will be described in detail.

At step S1101, the overlay network 704 configures a service QoS including a service related QoS about services performed in an overlay network 704 and a transport related QoS. The overlay network 704 may configure a service QoS according to a request of a service requester that is provided with a service from the overlay network 704.

At step S1103, the overlay network 704 searches services according to the service QoS using the service QoS. The overlay network 704 may search services additionally using context information about a service QoS.

At step S1105, the overlay network 704 performs a service related QoS about services performed at the overlay network 704 and transmits a transport related QoS to a service provider. Since a service is provided to the service requester through the overlay network 704, it is required to convert a part of the service QoS to the transport related QoS. Here, the service provider may be a low-level network of the overlay network 704.

At step S1107, the overlay network 704 monitors whether the provided service is matched with the service QoS and a QoS for the overlay network 704. When the service related QoS performed in the overlay network 704 at the Step S1105 is performed and the searched service is provided to the service provider, the overlay network 704 monitors and confirms whether the overlay network 704 satisfies the service QoS or not. The overlay network 704 may monitor whether a provided service searched according to the predetermined QoS policy is matched with a service QoS or not when the searched service is not matched with the service QoS.

The service QoS providing method of the overlay network 704 of FIG. 11 may be applied to the network management method using the overlay network. Here, the service provided at the step S1107 is published by the network managed element. Further, the service may include at least one of a service for monitoring events for state information of the managed element, a service analyzing a state of the managed element according to an event, a service generating flowchart according to an operation performed in the managed element, and a service for generating commands for the operation performed in the managed element according to the flowchart.

The above-described methods can also be embodied as computer programs. Codes and code segments constituting the programs may be easily construed by computer programmers skilled in the art to which the invention pertains. Furthermore, the created programs may be stored in computer-readable recording media or data storage media and may be read out and executed by the computers. Examples of the computer-readable recording media include any computer-readable recoding media, e.g., intangible media such as carrier waves, as well as tangible media such as CD or DVD.

The present application contains subject matter related to Korean Patent Applications Nos. 10-2009-0072495, 10-2009-0077203, and 10-2009-0126111, filed in the Korean Intellectual Property Office on Aug. 6, 2009, Aug. 20, 2009, and Dec. 17, 2009, the entire contents of which are incorporated herein by reference.

While the present invention has been described with respect to the specific embodiments, it will be apparent to those skilled in the art that various changes and modifications may be made without departing from the spirit and scope of the invention as defined in the following claims.

The invention claimed is:

1. A method for managing a network of an overlay network comprising:
   selecting a service according to a predetermined service QoS among network management services provided from a service provider in response to a request of a network manager;
   providing the selected service by performing to the network manager; and
   performing the service QoS and monitoring whether the provided service is matched with the serviced QoS or not,
   wherein the network management service is provided to the overlay network by being published by a low-level network of the service provider,
   wherein the network management service published from the low-level network is provided as a composition service or a basic service to the network manager according to the request of the network manager,
   wherein the request of the network manager according to an event of a managed element included in the network is provided to the overlay network,
   wherein a commands from the overlay network in response to the request of the network manager is provided to the network manager, and is published to the managed element,
   wherein the service QoS guarantees an end-to-end in the overlay network, wherein the service QoS is classified a service related QoS for a service performed in the overlay network and a transport related QoS, wherein the transport related QoS is a QoS related to the low-level network of a service provider or related to a network connected to the overlay network, wherein the service related QoS denotes requirements to constituent entities related to the service, and relates to service availability, accessibility, a response time, and a processing amount, and wherein the transport related QoS denotes requirements related to transport related constituent entities, and relates to a bandwidth, delay, and packet loss amount.

2. The method of claim 1, wherein said selecting a service comprises:
  selecting a composition service according to the service QoS; and
  selecting a plurality of basic services included in the composition service according to the service QoS.

3. The method of claim 2, wherein said providing the selected service comprises:
  requesting the plurality of selected basic services to the service provider; and
  performing a composition service combined with the plurality of basic services provided from the service provider according to the request.

4. The method of claim 1, wherein in said selecting a service,
  the service is selected additionally using context information about the service QoS.

5. The method of claim 1, wherein the network management service comprises at least one of:
  a monitoring service for monitoring events published by the managed element and including state information of the managed element;
  an analysis service for analyzing states of the managed element according to the events;
  a flowchart service for generating a flowchart according to an operation performed in the managed element using the analyzing result; and
  a command generation service for generating commands for operations performed in the managed element according to the flowchart.

6. A method for providing a service QoS of an overlay network, comprising:
  configuring a service QoS including a service related QoS about services performed in the overlay network and a transport related QoS;
  searching a service according to the service QoS using the service QoS;
  performing the service related QoS and transmitting the transport related QoS to a service provider that provides the service; and
  monitoring whether the providing of the searched service is matched with the service QoS, wherein the service provider is a low-level network of the overlay network, wherein the network management service published from the low-level network is provided as a composition service or a basic service to a network manager according to a request of the network manager, wherein the request of the network manager according to an event of a managed element included in a network is provided to the overlay network, wherein a commands from the overlay network in response to the request of the network manager is provided to the network manager, and is published to the managed element, wherein the service QoS guarantees an end-to-end in the overlay network, wherein the service QoS is classified a service related QoS for a service performed in the overlay network and a transport related QoS, wherein the transport related QoS is a QoS related to the low-level network of a service provider or related to a network connected to the overlay network, wherein the service related QoS denotes requirements to constituent entities related to the service, and relates to service availability, accessibility, a response time, and a processing amount, and wherein the transport related QoS denotes requirements related to transport related constituent entities, and relates to a bandwidth, delay, and packet loss amount.

7. The method of claim 6, wherein in said configuring a service QoS, the service QoS is configured according to a request of a service requester that is provided with a service from the overlay network.

8. The method of claim 6, wherein in said searching a service, the service is searched additionally using context information for the service QoS.

9. The method of claim 6, wherein in said monitoring whether the providing of the searched service is matched with the service QoS,
  the providing of the searched service is monitored whether the providing of the searched service is matched with a predetermined QoS policy when the providing of the searched service is not matched with the service QoS.

10. The method of claim 6, wherein the service comprises at least one of:
  a monitoring service for monitoring events about state information of the managed element and published by the managed element;
  an analysis service for analyzing states of the managed element according to the events;
  a flowchart generation service for generating a flowchart according to operation performed in the managed element; and
  a command generation service for generating commands of operations performed in the managed element according to the flowchart.

* * * * *